Patented Feb. 8, 1938

2,107,789

UNITED STATES PATENT OFFICE 2,107,789

METHOD OF MAKING CHLORHYDRIN

Charles G. Harford, Wollaston, Mass., assignor to Arthur D. Little, Incorporated, Cambridge, Mass., a corporation of Massachusetts No Drawing. Application February 13, 1931, Serial No. 515,640

62 Claims. (Cl. 260—157)

This invention relates to a method of converting organic compounds typically containing an ethylene group such as the various unsaturated hydrocarbons, into chlorhydrins or chlorhydrin esters, and to the resulting products obtained.

Chlorhydrins have heretofore been made by the direct reaction of the corresponding olefin and hypochlorous acid. Hypochlorous acid, however, is an extremely unstable reagent and can be obtained and used only in dilute aqueous solutions. Even such dilute solutions decompose readily and therefore they must be used as rapidly as they are made. Accordingly when hypochlorous acid is used undesirable side reactions are experienced and the reaction products obtained are generally dilute; and if a concentrated or pure compound is desired the product must be concentrated.

Moreover, the decomposition products of hypochlorous acid,—principally hydrochloric acid, chlorine and oxygen,—tend to react (with the olefins for example) to give undesirable by-products. These contaminate the desired product and are not easily removed therefrom.

A further difficulty encountered in the use of aqueous solutions of hypochlorous acid is their non-miscibility with olefins, or with hydrocarbons in general. As a result, irregular reaction and low proportionate yields of the desired reaction product are obtained, and a consequent waste or excessive consumption of reagent materials is unavoidably incurred.

It is therefore an object of this invention to provide a more convenient and more efficient method for the preparation of chlorhydrin and also of chlorhydrin esters. It is also an object to obtain such products in high proportionate yields and substantially free from other compounds. It is a further object to employ reagent materials which may be readily re-cycled for reuse in the process. Other objects will appear from the following description.

It is found, in accordance with the present invention, that organic compounds characterized by containing an ethylene group (—HC=CH—) such as the olefin hydrocarbons (which typically react with water, in the presence of a strong acid to form secondary alcohols) may be reacted upon directly with tertiary butyl hypochlorite in the presence of water and/or an organic acid to form the corresponding chlorhydrin compound, which may be chlorhydrin or chlorhydrin esters, respectively. The reaction is characterized by liberation of the tertiary alcohol which may be converted to the hypochlorite for reuse. The chemical reactions involved may be represented by the following equation:

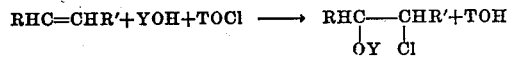

in which the symbols R and R' represent hydrogen or hydrocarbon radicals, which may be alike or unlike; Y represents hydrogen or an acyl radical; and T represents a tertiary alkyl radical.

By experiment it is found that ethylene, propylene, butylene, the amylenes, and also certain non-benzenoid, cyclic hydrocarbons such as the terpenes may be thus treated and that they react as indicated. It appears that the presence of an ethylene group (—HC=CH—) in the molecular structure is the criterion governing the applicability of a given compound or hydrocarbon in accordance with the invention. However, (without vitiating this rule) there may be certain inhibitions of the reactivity of the double bond in the manner indicated as is sometimes exemplified in the ethylene series of hydrocarbons as represented for example by failure to combine with bromine. This phenomenon of an occasional exception is generally attributable to steric hindrance in the internal structure of the molecule, which is a condition well recognized in organic chemistry. Likewise, it is well known that, in the ethylene series, for example, the reactivity of the double bond decreases with increase in the number of carbon atoms in the molecule. Thus, the facility with which the reaction of the present invention may be effected progressively decreases with the higher members of the series, so that a point may be reached at which the industrial application of the process becomes impracticable. With cetene ($C_{16}H_{32}$) for example, the reaction does not appear to be applicable.

In carrying out the process of this invention the preferred reagent of the type TOCl is tertiary butyl hypochlorite having the structural formula:

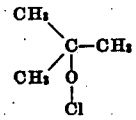

This reagent is conveniently prepared by the interaction of an inorganic hypochlorite, such as calcium hypochlorite, upon tertiary butyl alcohol. Tertiary butyl hypochlorite has desirable properties that commend it for the present use. In comparison with other organic hypochlorites it is quite stable. Furthermore it is an excellent solvent for hydrocarbons and organic acids, permitting through its use, for example, a reaction in one phase between an olefine, an organic acid and the hypochlorite. Owing probably to its comparative stability undesirable side reactions can be controlled. Yet another advantage of the particular hypochlorite is the ease and economy with which its decomposition product, tertiary butyl alcohol, can be separated from the chlorhydrin or chlorhydrin esters produced.

The invention will be described with respect to its application for the preparation of both chlorhydrin and chlorhydrin esters.

Example 1.—Preparation of chlorhydrin

Tertiary butyl hypochlorite (e. g., 108.5 grams) is preferably first mixed with an equimolecular proportion of pentene-2 (70 grams) and the mixture cooled sufficiently to avoid volatilization of the olefin. Water (18 grams) and a small amount of an acid as a catalyst, such as acetic (0.1 gram) are likewise mixed and cooled. Substantially any acid, including acetic, sulphuric, etc., may be employed as the catalyst and appears to be effective. The hypochlorite-pentene mixture is then slowly added to the aqueous solution of acid, with agitation and cooling of the reaction mixture. At first, the mixture is two phase, but as the water reacts with the hypochlorite-olefin reaction product, the lower phase decreases and ultimately disappears.

The resulting chlorhydrin may be separated from the reaction mixture by distillation or by washing, where the chlorhydrin is water insoluble as in the instant case. The recovered chlorhydrin is of high purity and the yield is almost equal to the theoretical quantity.

Example 2.—Preparation of chlorhydrin esters

Tertiary butyl hypochlorite (108.5 grams) is preferably mixed with butene-2 (56.1 grams) in substantially equimolecular proportions and the reaction mixture cooled, as before to prevent volatilization of the butene, or under sufficient pressure to effect the same result. The hypochlorite-butene mixture is then slowly added to acetic acid, with agitation and cooling of the reaction mixture, e. g., 1 mol. or 60 grams of acetic acid may be used. This acid may be of any strength between 80% and 100%. (The balance is water.) The mixture, which is originally two-phase, becomes single phase as the reaction is completed. The chlorhydrin ester produced (acetate of butyl chlorhydrin or chlorbutyl acetate) may be separated from the residual tertiary alcohol by distillation or by washing with water.

The recovery of the tertiary butyl alcohol and reconversion to the corresponding tertiary butyl hypochlorite may be carried out in accordance with any of the usual and well known procedures for effecting the reaction. For example, the alcohol may be mixed with milk of lime or a solution of caustic soda, cooled to about 10° C. and treated with chlorine to effect complete conversion. The tertiary butyl hypochlorite, being insoluble in water, is readily separated and washed free from reaction products. Under some circumstances it may be feasible to form the tertiary butyl hypochlorite in the presence of the organic compound containing the group —HC=CH—.

Alternatively, however, it may be feasible and advantageous to use the tertiary butyl alcohol directly in the formation of chlorhydrins or chlorhydrin esters, rather than using the tertiary butyl hypochlorite and then recovering the corresponding alcohol which is subsequently reconverted into the hypochlorite for reuse, as above described. This may be accomplished by treating the reaction mixture of the organic compound or hydrocarbon containing the —HC=CH— group and the tertiary butyl alcohol as an intermediary with chlorine and milk of lime.

In the following claims the terms hypohalogenous acids and hypohalites are intended to include hypochlorous and hypobromous acids and hypochlorites and hypobromites, respectively, but not hypoiodous or hypofluorous acid, nor hypoiodites or hypofluorites.

It should be understood that the present disclosure is for the purpose of illustration only and that this invention includes all modifications and equivalents which fall within the scope of the appended claims.

I claim:

1. Method of making a chlorhydrin which comprises treating a non-benzenoid hydrocarbon containing the ethylene group —HC=CH— with a hypochlorite of a tertiary alcohol and with water.

2. Method of making a chlorhydrin which comprises treating a non-benzenoid hydrocarbon containing the ethylene group —HC=CH— with tertiary butyl hypochlorite and with water.

3. Method of making a chlorhydrin which comprises treating pentene-2 containing the ethylene group —HC=CH— with tertiary butyl hypochlorite and with water.

4. Method of making a chlorhydrin which comprises treating an olefin hydrocarbon with a hypochlorite of a tertiary alcohol and with water.

5. Method of making a chlorhydrin which comprises treating an olefin hydrocarbon with tertiary butyl hypochlorite and with water.

6. Method of making a chlorhydrin which comprises treating a butene with tertiary butyl hypochlorite and with water.

7. Method of making a chlorhydrin which comprises treating a hydrocarbon of the group consisting of the amylenes, butylenes, propylene and ethylene, with tertiary butyl hypochlorite and with water.

8. Method of making hydrocarbon derivatives which consists in the step of treating a non-benzenoid hydrocarbon containing the ethylene group —HC=CH— with a hypochlorite of a tertiary alcohol.

9. Method of making hydrocarbon derivatives which consists in the step of treating a non-benzenoid hydrocarbon containing the ethylene group —HC=CH— with tertiary butyl hypochlorite.

10. Method of making hydrocarbon derivatives which consists in the step of treating an olefin hydrocarbon containing the ethylene group —HC=CH— with a tertiary butyl hypochlorite.

11. Method of making a chlorhydrin which comprises as a step treating the reaction product of a non-benzenoid hydrocarbon containing an ethylene group —HC=CH— and a hypochlorite of a tertiary alcohol with water.

12. Method of making a chlorhydrin which comprises as a step treating the reaction product of a non-benzenoid hydrocarbon containing an ethylene group —HC=CH— and tertiary butyl hypochlorite with water.

13. Method of making a chlorhydrin which comprises as a step treating the reaction product of an olefin hydrocarbon and tertiary butyl hypochlorite with water.

14. Method of making a chlorhydrin, which comprises reacting a non-benzenoid hydrocarbon containing the ethylene group —HC=CH—, in the presence of water and a tertiary alcohol, with a reagent containing a reactive —OCl radical.

15. Method of making a chlorhydrin, which comprises reacting a non-benzenoid hydrocarbon containing the ethylene group —HC=CH— in the presence of water and tertiary butyl alcohol, with a reagent containing a reactive —OCl radical.

16. Method of making a chlorhydrin, which comprises reacting an olefin hydrocarbon in the presence of water and a tertiary alcohol, with hypochlorite of a metal selected from the group consisting of alkali metals and alkaline earth metals.

17. Method of making a chlorhydrin which comprises reacting an olefin hydrocarbon with a hypochlorite of a tertiary alcohol and water, in the presence of an organic acid catalyst.

18. Method of making a chlorhydrin which comprises reacting upon an organic compound containing the ethylene group with a hypochlorite of a tertiary alcohol and with water.

19. Method of making a chlorhydrin which comprises reacting upon an organic compound containing the ethylene group with tertiary butyl hypochlorite and with water.

20. Method of making a chlorhydrin which comprises reacting upon an organic compound containing the ethylene group with a solution of a tertiary alcohol and a hypochlorite of a tertiary alcohol and with water.

21. Method of making a chlorhydrin which comprises reacting upon an organic compound containing the ethylene group with a solution of tertiary butyl hypochlorite and tertiary butyl alcohol and with water.

22. Method of treating unsaturated compounds which comprises reacting upon an organic compound containing an unsaturated carbon linkage of the non-benzenoid type with a hypohalite of a tertiary alcohol and water.

23. Method of treating unsaturated compounds which comprises reacting upon an organic compound containing an unsaturated carbon linkage of the non-benzenoid type with tertiary butyl hypohalite and water.

24. Method of treating unsaturated compounds which comprises reacting upon an organic compound containing an unsaturated carbon linkage of the non-benzenoid type with tertiary butyl hypochlorite and water.

25. Method of making a chlorhydrin which comprises reacting upon an organic compound containing the ethylene group with a hypohalite of a tertiary alcohol and water.

26. Method of making a chlorhydrin which comprises reacting upon an organic compound containing the ethylene group with tertiary butyl hypohalite and water.

27. Method of treating unsaturated compounds which comprises reacting upon an organic compound containing an ethylene group in the presence of water and a tertiary alcohol, with a reagent containing a reactive hypohalite radical.

28. Method of treating unsaturated compounds which comprises reacting upon an organic compound containing an ethylene group in the presence of water and a tertiary alcohol, with a reagent containing a reactive hypochlorite radical.

29. Method of treating unsaturated compounds which comprises reacting upon an organic compound containing an ethylene group, in the presence of water and a tertiary alcohol, with a hypohalite of a metal selected from the group consisting of the alkali metals and alkaline earth metals.

30. Method of treating unsaturated compounds which comprises reacting upon an organic compound containing an ethylene group, in the presence of water and a tertiary alcohol, with a hypochlorite of a metal selected from the group consisting of the alkali metals and alkaline earth metals.

31. Method of treating unsaturated compounds which consists in reacting upon an organic compound containing the ethylene group with a hypohalite of a tertiary alcohol.

32. Method of treating unsaturated compounds which comprises reacting upon an organic compound containing the ethylene group with a tertiary butyl hypohalite.

33. Method of treating unsaturated compounds which comprises reacting the reaction product of an organic compound containing an ethylene group and a hypohalite of a tertiary alcohol with water.

34. Method of treating unsaturated compounds which comprises reacting the reaction product of an organic compound containing an ethylene group and a hypohalite of tertiary butyl alcohol with water.

35. Method of treating unsaturated compounds which comprises reacting the reaction product of an organic compound containing an ethylene group and a hypochlorite of a tertiary alcohol with water.

36. Method of treating unsaturated compounds which comprises reacting the reaction product of an organic compound containing an ethylene group and tertiary butyl hypochlorite with water.

37. Method of treating unsaturated compounds which comprises reacting the reaction product of a hydrocarbon containing an ethyelene group and a hypohalite of a tertiary alcohol with water.

38. Method of treating unsaturated compounds which comprises reacting the reaction product of a hydrocarbon containing an ethyelene group and a hypohalite of tertiary butyl alcohol with water.

39. Method of treating unsaturated compounds which comprises reacting the reaction product of a hydrocarbon containing an ethyelene group and a hypochlorite of a tertiary alcohol with water.

40. Method of treating unsaturated compounds which comprises reacting the reaction product of a hydrocarbon containing an ethylene group and tertiary butyl hypochlorite with water.

41. Method of making hydrocarbon derivatives, which consists in the step of treating an olefin with a hypohalite of a tertiary alcohol.

42. Method of making hydrocarbon derivatives, which consists in the step of treating an olefin with a hypohalite of tertiary butyl alcohol.

43. Method of making hydrocarbon derivatives, which consists in the step of treating a hydrocarbon of the group consisting of amylenes, butylenes, propylene and ethylene with a hypohalite of a tertiary alcohol.

44. Method of making hydrocarbon derivatives, which consists in the step of treating butene-2 with a hypohalite of a tertiary alcohol.

45. Method of making hydrocarbon derivatives, which consists in the step of treating pentene-2 with a hypohalite of a tertiary alcohol.

46. Method of making hydrocarbon derivatives, which comprises the step of treating a non-benzenoid hydrocarbon containing the ethylene group with a hypohalite of a tertiary alcohol and water.

47. Method of making hydrocarbon derivatives, which comprises the step of treating a non-benzenoid hydrocarbon containing the ethylene group with a hypohalite of tertiary butyl alcohol and water.

48. Method of making hydrocarbon derivatives, which comprises the step of treating an olefin with a hypohalite of a tertiary alcohol and water.

49. Method of making hydrocarbon derivatives, which comprises the step of treating an olefin with a hypohalite of tertiary butyl alcohol and water.

50. Method of making hydrocarbon derivatives, which comprises the step of treating a hydrocarbon of the group consisting of amylenes, butylenes, propylene and ethylene with a hypohalite of a tertiary alcohol and water.

51. Method of making hydrocarbon derivatives, which comprises the step of treating butylene-2 with a hypohalite of a tertiary alcohol and water.

52. Method of making hydrocarbon derivatives, which comprises the step of treating pentene-2 with a hypohalite of a tertiary alcohol and water.

53. Method of treating unsaturated compounds which comprises reacting upon an organic compound containing an unsaturated carbon linkage of the non-benzenoid type with a hypohalite of a tertiary alcohol and water, in the presence of an organic acid catalyst.

54. Method of treating unsaturated compounds which comprises reacting upon an organic compound containing an unsaturated carbon linkage of the non-benzenoid type with a hypochlorite of a tertiary alcohol and water, in the presence of an organic acid catalyst.

55. A process for the preparation of halohydrins which comprises reacting an organic compound possessing an olefinic linkage with a tertiary ester of a hypohalogenous acid containing a tertiary alkyl group contiguous to the hypohalogenous acid radical, in the presence of water.

56. A process for the preparation of chlorhydrins which comprises reacting an olefine with tertiary butyl hypochlorite in the presence of water.

57. Method of making hydrocarbon derivatives, which comprises the step of treating a hydrocarbon containing the ethylene group with a tertiary alkyl hypohalite and with water.

58. Method of making hydrocarbon derivatives, which comprises the step of treating a non-benzenoid hydrocarbon containing the ethylene group with a tertiary alkyl hypohalite and with water.

59. Method of making hydrocarbon derivatives, which comprises the step of treating an olefin with a tertiary alkyl hypohalite and with water.

60. Method of making chlorhydrin which comprises the step of treating the reaction product of a hydrocarbon containing an ethylene group and a hypohalite of a tertiary alkyl alcohol with water.

61. Method of making a chlorhydrin, which comprises reacting a hydrocarbon containing the ethylene group in the presence of water and a tertiary alkyl alcohol with a reagent containing a reactive hypohalite radical.

62. Method of making a chlorhydrin which comprises reacting upon an organic compound containing the ethylene group with a solution of a tertiary alkyl alcohol and a hypohalite of a tertiary alcohol and with water.

CHARLES G. HARFORD.